(12) United States Patent
Chen

(10) Patent No.: US 10,105,768 B2
(45) Date of Patent: Oct. 23, 2018

(54) CUTTER HOLDER WITH VIBRATION RESISTANT STRUCTURE

(71) Applicant: Ching-Ting Chen, Taichung (TW)

(72) Inventor: Ching-Ting Chen, Taichung (TW)

( * ) Notice: Subject to any disclaimer, the term of this patent is extended or adjusted under 35 U.S.C. 154(b) by 196 days.

(21) Appl. No.: 15/201,936

(22) Filed: Jul. 5, 2016

(65) Prior Publication Data

US 2018/0009042 A1   Jan. 11, 2018

(51) Int. Cl.
| | |
|---|---|
| *B23B 29/02* | (2006.01) |
| *B23C 5/06* | (2006.01) |
| *B23C 5/00* | (2006.01) |
| *B23B 27/00* | (2006.01) |
| *B23B 31/11* | (2006.01) |
| *B23Q 11/00* | (2006.01) |

(52) U.S. Cl.
CPC ............ *B23C 5/003* (2013.01); *B23B 27/002* (2013.01); *B23B 31/11* (2013.01); *B23C 5/06* (2013.01); *B23Q 11/0032* (2013.01); *B23B 29/022* (2013.01); *B23B 2250/16* (2013.01); *B23C 2250/16* (2013.01)

(58) Field of Classification Search
CPC . B23C 5/003; B23C 2250/16; B23C 2210/02; B23B 29/022; B23B 2250/16; B23B 27/002
See application file for complete search history.

(56) References Cited

U.S. PATENT DOCUMENTS

| | | | | |
|---|---|---|---|---|
| 3,838,936 | A * | 10/1974 | Andreassen | B23B 29/022 188/268 |
| 3,923,414 | A * | 12/1975 | Hopkins | B23B 29/022 408/143 |
| 5,413,318 | A * | 5/1995 | Andreassen | B23B 29/022 173/211 |
| 9,061,356 | B2 * | 6/2015 | Haimer | B23B 31/1177 |
| 2002/0190449 | A1 * | 12/2002 | Takahashi | B23B 29/022 267/141 |
| 2005/0258580 | A1 * | 11/2005 | Digernes | B23B 29/022 267/137 |
| 2006/0275090 | A1 * | 12/2006 | Onozuka | B23B 29/022 408/143 |
| 2009/0257838 | A1 * | 10/2009 | Ostermann | B23B 29/022 408/143 |

(Continued)

FOREIGN PATENT DOCUMENTS

| | | | | |
|---|---|---|---|---|
| JP | 2011-011276 A | * | 1/2011 | ............ B23B 29/02 |
| JP | 2015-110257 A | * | 6/2015 | ............ B23B 29/02 |

(Continued)

*Primary Examiner* — Ryan Rufo
(74) *Attorney, Agent, or Firm* — Browdy and Neimark, P.L.L.C.

(57) ABSTRACT

A cutter holder has a body and a damping assembly. The damping assembly is contained inside the body. The damping assembly has a central damping pole and six auxiliary damping poles. The six auxiliary damping poles are arranged around the central damping pole. The body has a specific weight. The central damping pole has a specific weight larger than the specific weight of the body. Each one of the six auxiliary damping poles has a specific weight larger than the specific weight of the body. The damping assembly is utilized to reduce vibrations caused by machining.

8 Claims, 5 Drawing Sheets

(56) References Cited

U.S. PATENT DOCUMENTS

| | | | | |
|---|---|---|---|---|
| 2010/0242696 A1* | 9/2010 | Digernes | ................ | B23B 27/10 |
| | | | | 83/169 |
| 2013/0206525 A1* | 8/2013 | Ogata | ................... | B23B 27/002 |
| | | | | 188/381 |
| 2015/0328698 A1* | 11/2015 | Otani | ...................... | B23C 5/265 |
| | | | | 409/136 |
| 2016/0008892 A1* | 1/2016 | Haimer | .................. | B23B 31/02 |
| | | | | 279/102 |
| 2016/0067787 A1* | 3/2016 | Giannetti | ................ | G01M 1/02 |
| | | | | 29/407.01 |
| 2016/0107242 A1* | 4/2016 | McCormick | ............ | B23B 31/08 |
| | | | | 279/143 |
| 2016/0214182 A1* | 7/2016 | Eichelberger | ......... | B23B 29/022 |
| 2016/0311031 A1* | 10/2016 | Giannetti | .............. | B23B 29/022 |
| 2017/0189971 A1* | 7/2017 | Chen | ..................... | B23B 31/201 |
| 2017/0197251 A1* | 7/2017 | Nakatani | ............... | B23B 29/022 |

FOREIGN PATENT DOCUMENTS

| | | | | |
|---|---|---|---|---|
| KR | 1332467 B1 * | 11/2013 | ........... | B23B 27/002 |
| WO | WO 2014202869 A1 * | 12/2014 | ............. | B23C 5/003 |
| WO | WO 2015198792 A1 * | 12/2015 | ............. | B23B 29/02 |

* cited by examiner

CUTTER HOLDER WITH VIBRATION RESISTANT STRUCTURE

BACKGROUND OF THE INVENTION

1. Field of the Invention

The present invention relates to a machine tool, and more particularly to a cutter holder that can resist vibrations caused by machining.

2. Description of Related Art

Vibrations of a cutter holder easily occur as the rigidness of the cutter holder is insufficient, the frequency of the reaction force and the resonance frequency of the cutter holder are similar, or the cutter holder is suddenly encountered with an intense reaction force. Generally, the conventional cutter holder inevitably generates vibrations during machining. The vibrations have little influence on processing quality when utilizing cutter holders with shorter lengths. However, for cutter holders with longer lengths, the vibrations decrease the efficiency of machining, generate noise, and form obvious marks of machining and a rough surface on a work piece. The conventional cutter holder lacks vibration resistant structures and consequently brings about negative influence on the quality of the work piece.

To overcome the shortcomings of the conventional cutter holder, the present invention provides a vibration resistant cutter holder to mitigate or obviate the aforementioned problems.

SUMMARY OF THE INVENTION

The main objective of the present invention is to provide a vibration resistant cutter holder that can avoid the negative influence brought about by vibrations during machining and perform high-quality machining.

The cutter holder comprises a body and a damping assembly. The damping assembly is contained inside the body. The damping assembly has a central damping pole and six auxiliary damping poles. The six auxiliary damping poles are arranged around the central damping pole. The body has a specific weight. The central damping pole has a specific weight larger than the specific weight of the body. Each one of the six auxiliary damping poles has a specific weight larger than the specific weight of the body as well. The damping assembly is utilized to reduce vibrations caused by machining.

Other objects, advantages, and novel features of the invention will become more apparent from the following detailed description when taken in conjunction with the accompanying drawings.

DETAILED DESCRIPTION OF PREFERRED EMBODIMENT

Figure 1:
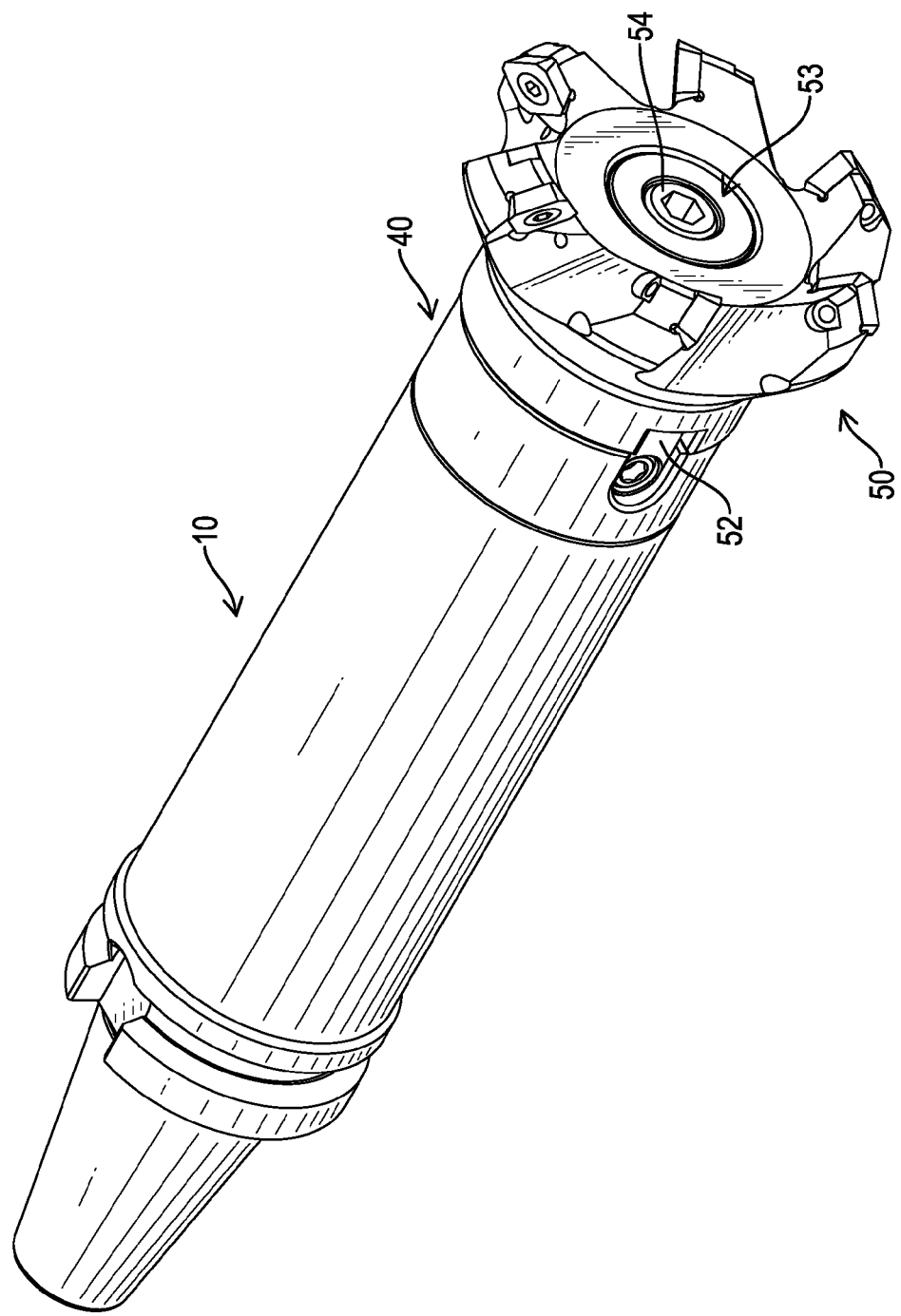
FIG. 1 is a perspective view of a cutter holder in accordance with the present invention.
Figure 2:
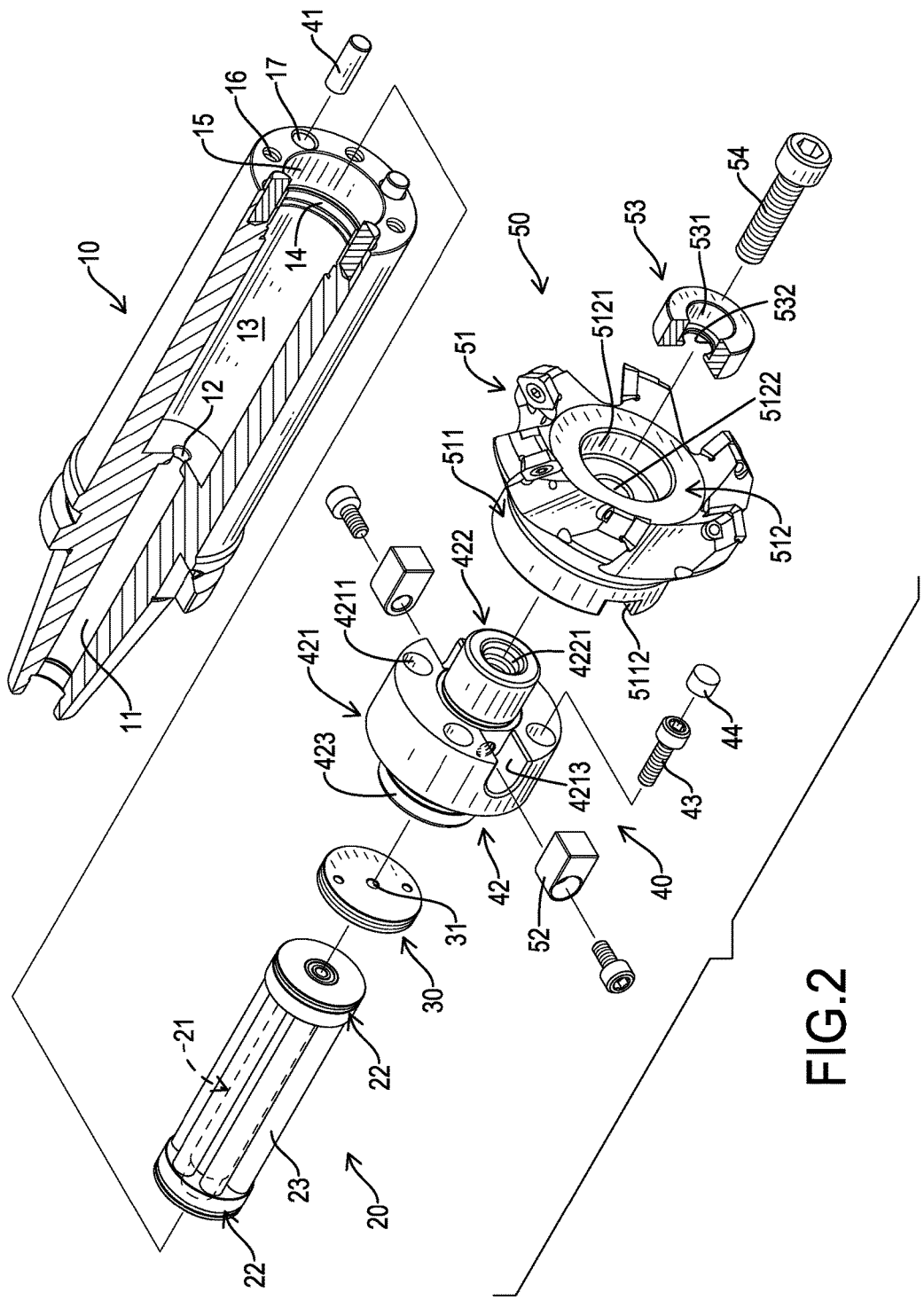
FIG. 2 is a partially exploded perspective view in partial section of the cutter holder in FIG. 1.
Figure 4:
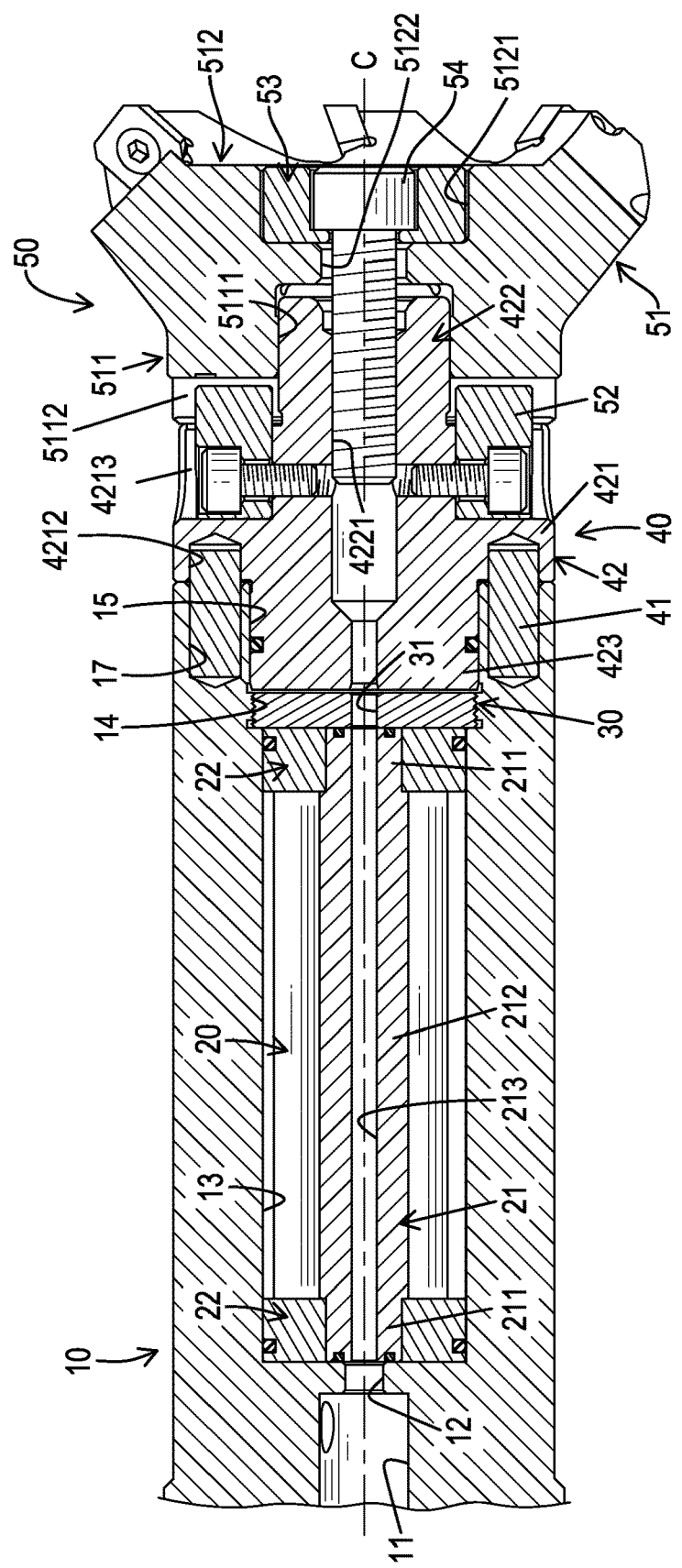
FIG. 4 is a side view in partial section of the cutter holder in FIG. 1.
Figure 5:
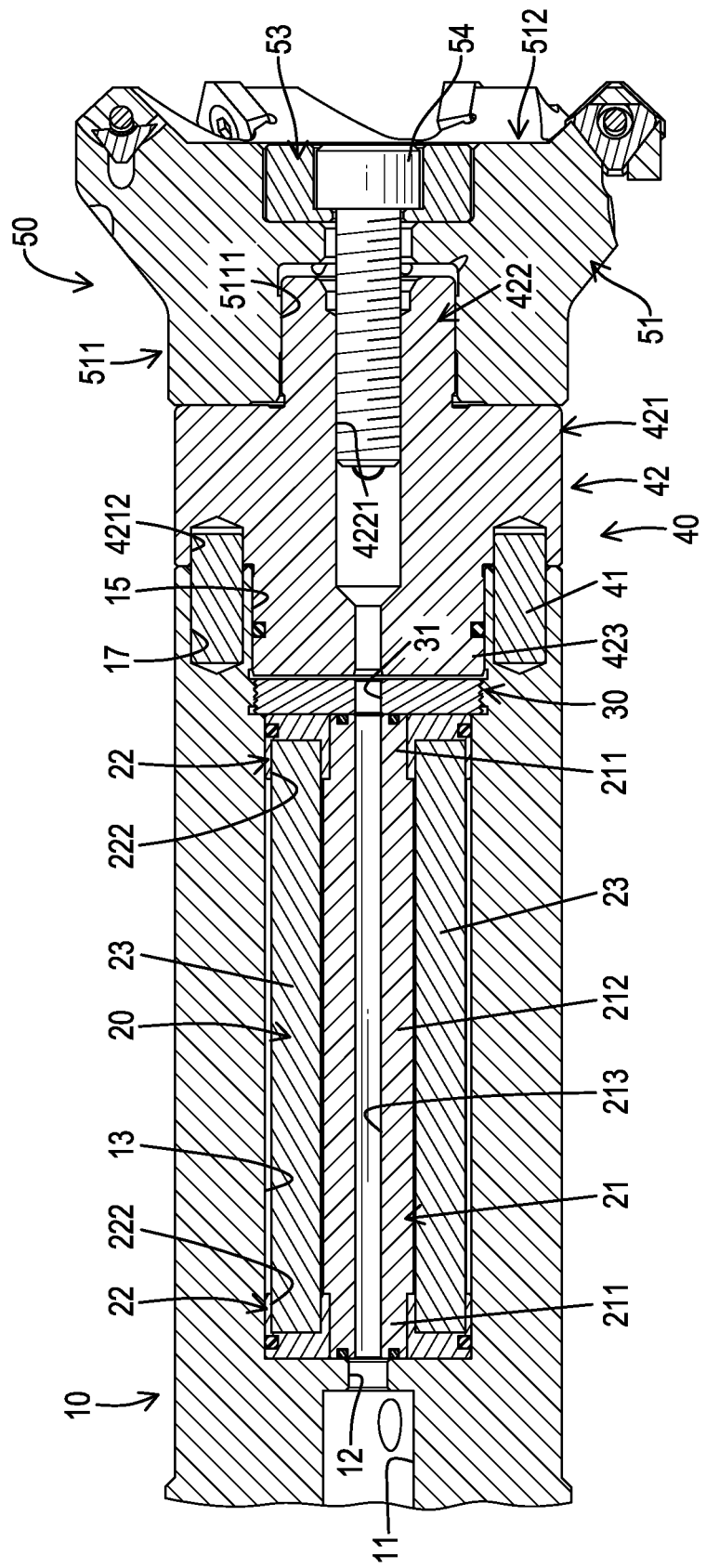
FIG. 5 is another side view in partial section of the cutter holder in FIG. 1.

With reference to FIGS. 1, 2, and 4, a vibration resistant cutter holder in accordance with the present invention comprises a body 10, a damping assembly 20, a limiting unit 30, a fastening assembly 40, and a cutter assembly 50. The damping assembly 20 is contained inside the body 10. The limiting unit 30 is mounted in the body 10 and abuts against the damping assembly 20. The fastening assembly 40 is assembled on the body 10. The cutter assembly 50 is assembled on the fastening assembly 40.

With reference to FIGS. 2 and 4, the body 10 has a specific weight, a longitudinal direction, a first end, a second end, a guiding hole 11, a communicating hole 12, a receiving hole 13, a connecting hole 14, a mounting hole 15, four connecting threaded holes 16, and four pin holes 17. The longitudinal direction is along a central line C as shown in FIG. 4. The first end and the second end of the body 10 are opposite each other in the longitudinal direction of the body 10. The second end has a flat end face. The guiding hole 11 is axially defined inside the body 10 and has a diameter. The guiding hole 11 extends from the first end of the body 10 toward the second end of the body 10. The communicating hole 12 is axially defined inside the body 10. The communicating hole 12 coaxially communicates with the guiding hole 11 and has a diameter. The diameter of the communicating hole 12 is smaller than the diameter of the guiding hole 11.

With reference to FIGS. 2 and 4, the receiving hole 13 is axially defined inside the body 10 at a side of the communicating hole 12 opposite the guiding hole 11 and coaxially communicates with the communicating hole 12. The receiving hole 13 and the guiding hole 11 communicate with each other via the communicating hole 12. The receiving hole 13 has a diameter larger than the diameter of the guiding hole 11. The connecting hole 14 is axially defined inside the body 10 at a side of the receiving hole 13 opposite the communicating hole 12 and coaxially communicates with the receiving hole 13. The connecting hole 14 has an inner surface and an internal thread formed on the inner surface of the connecting hole 14. The mounting hole 15 is axially defined inside the body 10 at a side of the connecting hole 14 opposite the receiving hole 13 and coaxially communicates with the connecting hole 14. The mounting hole 15 extends to the flat end face of the second end of the body 10.

With reference to FIG. 2, the four connecting threaded holes 16 are disposed around the mounting hole 15 at angular intervals from each other. Each one of the connecting threaded holes 16 extends from the flat end face of the second end of the body 10 toward the first end of the body 10. The four pin holes 17 are disposed around the mounting hole 15 at angular intervals. Each one of the pin holes 17 is located between two adjacent ones of the connecting threaded holes 16 and extends from the flat end face of the second end of the body 10 toward the first end of the body 10.

Figure 3:
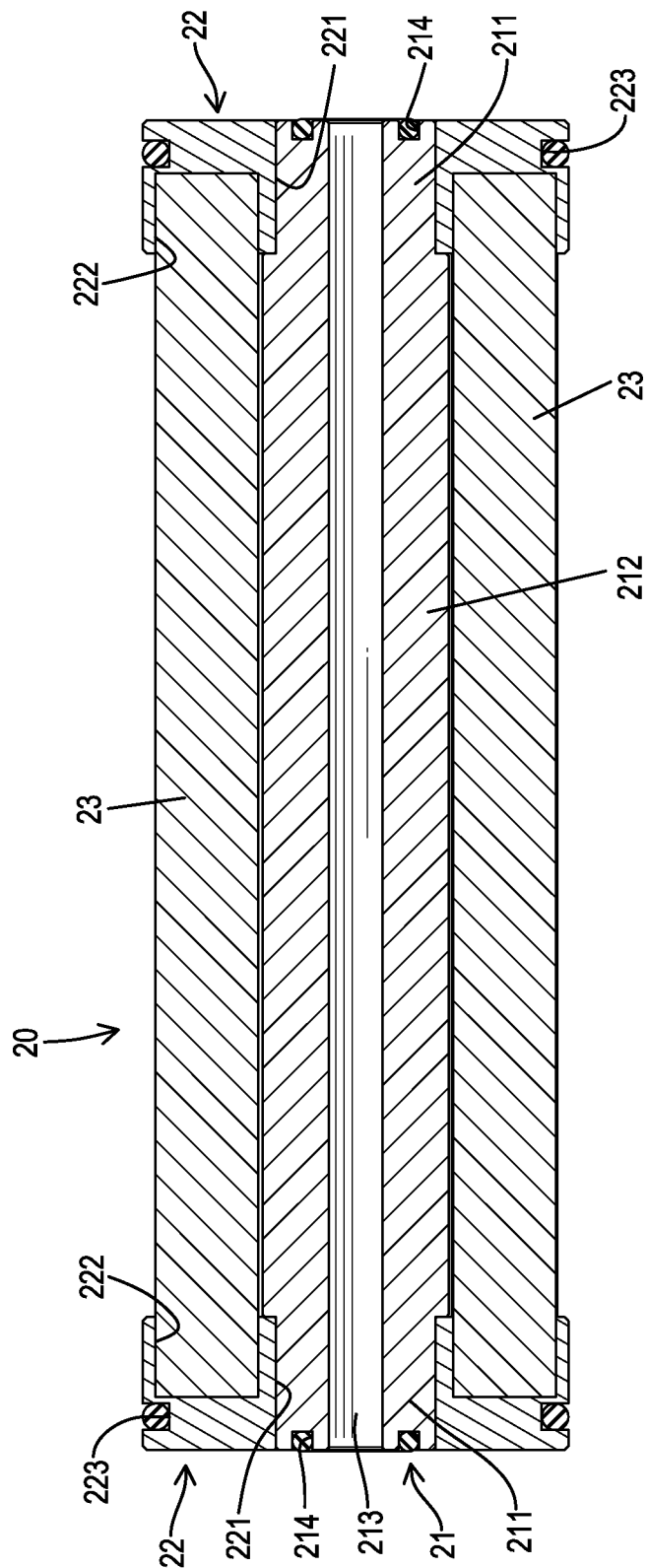
FIG. 3 is a cross-sectional side view of a damping assembly of the cutter holder in FIG. 2.

With reference to FIGS. 2, 3, and 4, the damping assembly 20 is contained in the receiving hole 13 of the body 10. The damping assembly 20 has a central damping pole 21, two covers 22, and six auxiliary damping poles 23. The central damping pole 21 has the same longitudinal direction as the body 10 and has a specific weight, two opposite ends, two inserting sections 211, a central section 212, a channel 213, and two receiving grooves 214. The specific weight of the central damping pole 21 is larger than the specific weight of the body 10. The two inserting sections 211 are respectively located at the two opposite ends of the central damping pole 21. Each one of the two inserting sections 211 is cylindrical and has a diameter and a flat end face. The two flat end faces of the two inserting sections 211 respectively face to two opposite directions.

With reference to FIGS. 2, 3, and 4, the central section 212 is between the two inserting sections 211, is cylindrical, and has a diameter and two opposite ends. The diameter of the central section 212 is larger than the diameter of each one of the two inserting sections 211. The two opposite ends of the two central sections 212 are coaxially and respectively connected to the two inserting sections 211. The channel 213 is axially defined inside the central section 212 and extends to the two flat end faces of the two inserting sections 211. The two receiving grooves 214 are respectively and coaxially formed in the two flat end faces of the two inserting sections 211. Each one of the two receiving grooves 214 encircles the channel 213, and two seals are respectively mounted in the two receiving grooves 214.

With reference to FIGS. 2 to 5, the two covers 22 are respectively connected to the two opposite ends of the central damping pole 21. Each one of the two covers 22 is a round plate and has a side face, a peripheral surface, an inserting hole 221, six mounting recesses 222, and an annular groove 223. The side faces of the two covers 22 face each other. The inserting hole 221 is axially defined through the cover 22 and is mounted on and around one of the two inserting sections 211. The six mounting recesses 222 are defined in the side face of the cover 22. The six mounting recesses 222 are arranged around the inserting hole 221 at angular intervals. The annular groove 223 is formed in the peripheral surface of the cover 22, and a seal is mounted in the annular groove 23. The two covers 22 are respectively connected to the two inserting sections 211 via the two inserting holes 221.

With reference to FIGS. 2 to 5, each auxiliary damping pole 23 has the same longitudinal direction as the body 10 and has a specific weight and two opposite ends respectively connected to the two covers 22. The specific weight of each one of the six auxiliary damping poles 23 is larger than the specific weight of the body 10. One of the two opposite ends of each auxiliary damping pole 23 is mounted in one of the six mounting recesses 222 of one of the covers 22. The other end of the auxiliary damping pole 23 is mounted in another one of the six mounting recesses 222 of the other cover 22. The six auxiliary damping poles 23 are arranged around the central damping pole 21 at angular intervals. The central damping pole 21 and the six auxiliary damping poles 23 may be made of tungsten alloy.

With reference to FIGS. 2 and 4, the limiting unit 30 is mounted inside the body 10. The limiting unit 30 is a round plate and has a peripheral surface, an external thread, and a through hole 31. The external thread is formed on the peripheral surface of the limiting unit 30. The through hole 31 is axially defined through the limiting unit 30 and communicates with the channel 213 of the central damping pole 21. The external thread of the limiting unit 30 is screwed with the internal thread of the connecting hole 14 of the body 10. The limiting unit 30 is utilized to block the damping assembly 20 contained in the receiving hole 13 of the body 10.

With reference to FIGS. 2 and 4, the fastening assembly 40 is connected to the second end of the body 10. The fastening assembly 40 has four pins 41, a fastening unit 42, four bolts 43, and four bolt covers 44. The four pins 41 are respectively mounted in the four pin holes 17 of the body 10. The fastening unit 42 is connected to the second end of the body 10. The fastening unit 42 has a flange portion 421, a positioning section 422, and an inserting section 423. The flange portion 421 is cylindrical and has a surface, a rim, a first end face, a second end face, four fastening holes 4211, four retaining holes 4212, and two keyways 4213.

With reference to FIGS. 2 and 4, the first end face and the second end face of the flange portion 421 are flat and respectively face to two opposite directions. The four fastening holes 4211 are arranged at angular intervals and are adjacent to the rim of the flange portion 421. Each one of the four fastening holes 4211 extends from the second end face of the flange portion 421 to the first end face of the flange portion 421. The four retaining holes 4212 are arranged at angular intervals and are respectively mounted on and around the four pins 41. Each one of the four retaining holes 4212 is located between two adjacent ones of the fastening holes 4211 and extends from the second end face of the flange portion 421 toward the first end face of the flange portion 421. The two keyways 4213 are diametrically opposite each other. Each one of the keyways 4213 is radially defined in the surface of the flange portion 421, extends to the first end face of the flange portion 421, and has a bottom.

With reference to FIGS. 2 and 4, the positioning section 422 is coaxially connected to the first end face of the flange portion 421 and is surrounded by the four fastening holes 4211. The positioning section 422 is cylindrical and has an end face and a threaded hole 4221. The end face of the positioning section 422 is distal from the flange portion 421. The threaded hole 4221 is axially defined in the end face of the positioning section 422 and extends toward the flange portion 421. The threaded hole 4221 has an inner surface and a thread formed on the inner surface of the threaded hole 4211. The inserting section 423 is cylindrical, is coaxially connected to the second end face of the flange portion 421, and is surrounded by the four fastening holes 4211 and the four retaining holes 4212. The inserting section 423 is mounted in the mounting hole 15 of the body 10 and makes the fastening unit 42 connected to the body 10.

With reference to FIG. 2, the four bolts 43 are respectively mounted through the four fastening holes 4211 and are respectively screwed in the four connecting threaded holes 16 of the body 10. The four bolt covers 44 are respectively mounted in the four fastening holes 4211.

With reference to FIGS. 2 and 4, the cutter assembly 50 is assembled on the fastening assembly 40 and has a cutter 51, two keys 52, a pressing unit 53, and a pressing bolt 54. The cutter 51 is connected to the fastening unit 42 of the fastening assembly 40. The cutter 51 has a mounting section 511 and a cutting portion 512. The mounting section 511 is cylindrical and has a surface, a flat end face, a positioning hole 5111, and two key slots 5112. The positioning hole 5111 is axially defined in the flat end face of the mounting section 511 and is mounted on and around the positioning section 422 of the fastening unit 42. The two key slots 5112 are diametrically opposite each other and are respectively aligned with the two keyways 4213 of the flange portion 421 of the fastening unit 42. Each one of the two key slots 5112 is radially defined in the surface of the mounting section 511 and communicates with the positioning hole 5111. The cutting portion 512 is coaxially connected to the mounting section 511 and has a containing hole 5121 and a bolt through hole 5122. The containing hole 5121 is axially defined inside the cutting portion 512 and has a bottom. The bolt through hole 5122 is axially defined in the bottom of the containing hole 5121 and coaxially communicates with the positioning hole 5111.

With reference to FIGS. 2 and 4, the two keys 52 are respectively held in the two keyways 4213 and are respectively engaged with the two key slots 5112. Two bolts are respectively mounted through the two keys 52 and are respectively screwed in the bottoms of the two keyways 4213. The pressing unit 53 is cylindrical and is mounted in the containing hole 5121 of the cutting portion 512 of the cutter 51. The pressing unit 53 has a first end face, a second end face, a receiving recess 531, and a passing hole 532. The first end face and the second end face of the pressing unit 53 are opposite each other. The receiving recess 531 is axially defined in the first end face of the pressing unit 53, extends toward the second end face of the pressing unit 53, and has a bottom. The passing hole 532 is coaxially defined in the bottom of the receiving recess 531 and extends to the second end face of the pressing unit 53. The pressing bolt 54 is mounted through the receiving recess 531 and the passing hole 532 of the pressing unit 53, and is screwed in the threaded hole 4221 of the positioning section 422 of the fastening unit 42.

The specific weight of the central damping pole 21 and the specific weight of each one of the six auxiliary damping poles 23 are larger than the specific weight of the body 10. Thereby, the damping assembly 20 can reduce vibrations caused by machining and achieve the goal of elevating machining quality and reducing noise. The number and the locations of the auxiliary damping poles 23 can be altered to match the practical machining condition. The two seals respectively mounted in the two receiving grooves 214 and the two seals respectively mounted in the two annular grooves 223 of the two covers 22 can prevent the cutting fluid from flowing out from the conjunction portions between parts.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A cutter holder comprising:
    a body having
        a specific weight;
        a longitudinal direction;
        a first end;
        a second end being opposite the first end of the body in the longitudinal direction of the body and having a flat end face;
        a guiding hole axially defined inside the body and extending from the first end of the body toward the second end of the body; and
        a receiving hole axially defined inside the body and communicating with the guiding hole;
    a damping assembly contained in the receiving hole and having
        a central damping pole having the same longitudinal direction as the body and having
            a specific weight being larger than the specific weight of the body;
            two opposite ends; and
            a channel axially defined through the central damping pole, extending to the two opposite ends of the central damping pole, and communicating with the guiding hole;
        two covers respectively connected to the two opposite ends of the central damping pole;
        at least two auxiliary damping poles arranged between the two covers, arranged around the central damping pole, and spaced from the central damping pole, and each of the at least two auxiliary damping poles having the same longitudinal direction as the body and having
            a specific weight being larger than the specific weight of the body; and
            two opposite ends respectively directly connected to the two covers;
    a fastening assembly having
        a fastening unit connected to the second end of the body; and
    a cutter assembly having
        a cutter connected to the fastening unit.

2. The cutter holder as claimed in claim 1 further having a limiting unit mounted inside the body and having
    a through hole defined through the limiting unit and communicating with the channel of the central damping pole; wherein
    the body has a connecting hole coaxially communicating with the receiving hole; and
    the limiting unit is screwed in the connecting hole.

3. The cutter holder as claimed in claim 2, wherein the central damping pole has
    a central section having two opposite ends; and
    two inserting sections coaxial with and in direct contact with the two opposite ends of the central section;
    each one of the two covers has an inserting hole defined through the cover; and
    the inserting holes of the two covers are respectively located on and around the two inserting sections of the central damping pole.

4. The cutter holder as claimed in claim 3, wherein the central damping pole has two receiving grooves;
    each one of the two inserting sections of the central damping pole has a flat end face, and the two flat end faces of the two inserting sections respectively face to two opposite directions;
    the two receiving grooves are respectively formed in the two flat end faces of the two inserting sections; and
    two seals are respectively mounted in the two receiving grooves.

5. The cutter holder as claimed in claim 4, wherein each one of the two covers has
    a surface; and
    an annular groove formed in the surface of the cover; and
    two seals are respectively mounted in the two annular grooves of the two covers.

6. The cutter holder as claimed in claim 5, wherein each cover has
    a side face facing the side face of the other cover; and
    at least two mounting recesses defined in the side face of the cover and arranged around the inserting hole;
    the at least two mounting recesses of the cover are aligned with the at least two mounting recesses of the other cover along the longitudinal direction of the body to define at least two pairs of longitudinally aligned mounting recesses;
    the two opposite ends of each auxiliary damping pole are mounted respectively in one of the at least two pairs of the longitudinally aligned mounting recesses.

7. The cutter holder as claimed in claim 6, wherein the at least two auxiliary damping poles are implemented as six in amount;

the at least two mounting recesses of each one of the two covers are implemented as six in amount; and the six auxiliary damping poles are respectively mounted in the twelve mounting recesses of the two covers.

8. The cutter holder as claimed in claim 7, wherein the central damping pole and the six auxiliary damping poles are made of tungsten alloy.

\* \* \* \* \*